United States Patent Office 3,345,868
Patented Oct. 10, 1967

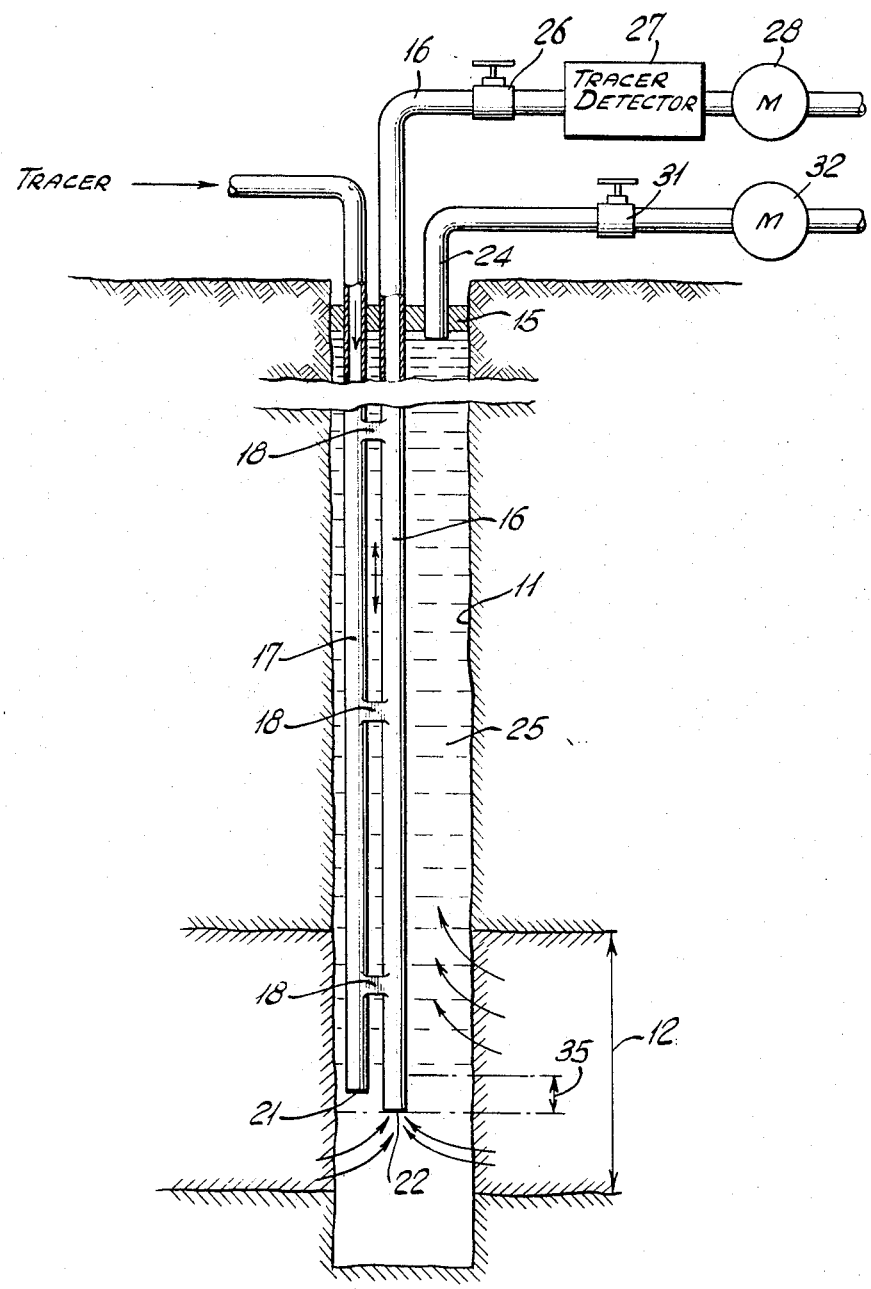

3,345,868
PRODUCTIVITY LOGGING APPARATUS
Karl C. ten Brink, Houston, Tex., assignor to Texaco Inc., New York, N.Y., a corporation of Delaware
Filed May 22, 1964, Ser. No. 372,135
4 Claims. (Cl. 73—155)

This is a continuation-in-part of copending application Ser. No. 87,947, filed Feb. 8, 1961, and now abandoned.

This invention is concerned with productivity logging in general. More specifically, it concerns a method of fluid productivity logging which involves the measurement of the profile of produced fluid in a gas or oil well, or the like. The invention is particularly adaptable for use with gas producing wells, and it has many advantages over known techniques.

It has been found desirable to make a productivity log in order that a profile of the fluid entry over the length of a producing zone, may be had. Such procedure is especially desirable when samples may be had of the fluid produced, at given levels over the producing zone. In prior methods it has been known to set up an arrangement whereby an interface is formed between two streams and a log is made which covers the producing interval in a well. However, in such prior art methods there has been the requirement of running a detector instrument downhole from the surface, in order to locate the interface between the two flowing streams that are thus formed. Such requirement involved attendant difficulties and expense, in that the detector instrument must have the requisite expensive and delicate components. In addition there is the attendant requirement of having a great length of electrical conductor cable, for connecting the detector instrument with the surface. Furthermore, logging with special equipment of this sort necessitates use of highly skilled personnel for operating the equipment, and such total requirements are only available at high rental costs or with large investment in equipment and attendant high cost for the hiring of personnel.

Another requirement of much of the prior art productivity logging has been the use of a radioactive tracer material for distinguishing between the two streams in order to locate the interface therebetween. This is an inconvenience and burden because of the necessity of special care and handling with precautionary measures relating to the radio-active material.

Consequently it is an object of this invention to simplify productivity logging by eliminating the need to use a cable suspended tool for downhole detection of the presence of a tracer in one of the streams. Such elimination simplifies the entire procedure by removing the need to employ long and expensive cable, which cable required the inclusion of electrical conductor or conductors therein for transmitting signal data to the surface.

Another object of this invention is to provide an improved gas productivity logging method that involves direct measurement of interface location between two flowing streams resulting from causing production to divide over the extent of the producing zone. This method eliminates the need for use of a radioactive tracer, which use has its attendant dangers and difficulties.

Briefly, the invention concerns a method of fluid production logging of a well wherein said log covers the vertical extent of a production zone in said well. The method comprises the steps of movably introducing an open-end conduit into said well for dividing the produced fluid into two streams having an interface therebetween. One of said streams flows through said conduit, and the other flows through the annulus surrounding said conduit. It also comprises the steps of moving said conduit to place the open end thereof at a location vertically between the extremities of said production zone, and introducing a tracer material at a point fixed relative to, and adjacent, the open end of the conduit. It also comprises the steps of regulating the amount of fluid flowing in said two streams relative to one another, while detecting the presence of said tracer in said one stream until said presence is no longer detected; and the step of measuring the location of said open end of the conduit, which then has the interface between said two streams located thereat.

Again briefly, the invention relates to a combination for use in a gas producing well having a producing zone therein with a limited vertical extent. Such combination comprises a vertically movable conduit extending downhole with the open end thereof located vertically between the extremities of said producing zone, and a pipe attached to the exterior of said conduit and extending down beside the conduit. The said pipe has an open end located adjacent to, but displaced a relatively short vertical distance from said conduit open end. The combination also comprises means for sealing said well at the top thereof around said conduit and said pipe, and means for connecting the annulus of the well around said conduit for passing one stream of gas therethrough. Another stream of said gas flows through the said conduit. The combination also comprises means associated with one of the conduit and said annulus connecting means, and located at the surface adjacent to said well for detecting the presence of a tracer material that is introduced downhole through said pipe. Finally, the combination comprises, in addition, means for regulating the relative rate of flow of said two streams of gas in order that the location of the interface between said two streams may be shifted until the presence of tracer material is no longer detected.

The foregoing and other objects and benefits of the invention will be made clearer below in connection with a specific embodiment of the invention that is described by way of illustration thereof, and that is illustrated in the drawing wherein:

The figure of the drawing shows a schematic illustration of a well with some equipment included therewith as necessary for carrying out a preferred embodiment of the invention.

Referring to the drawing, it is pointed out that there is schematically illustrated a well 11 having a producing zone 12 downhole therein. In this embodiment the well is a gas production well, but it is pointed out that the principles of this invention apply equally as well to any production fluid although as presently conceived the invention is particularly adapted for use with gas wells.

In order to divide the flowing fluid that is being produced from the well 11 into two streams, there is a well head seal 15 that is schematically illustrated, as are all of the elements shown. In addition, there is a conduit 16 that extends through the seal 15 but is in sealing relation therewith, on the outside of the conduit. The conduit 16 extends downhole from the surface far enough to be able to reach the deepest extent of the producing zone 12, while the conduit is movably supported to allow positioning of the lower extremity from bottom to top in a movable manner. Thus conduit 16 may be vertically moved or positioned to place its lower extremity anywhere from the lowest extent of zone 12 to the top thereof.

In addition, there is a pipe 17 that passes through the seal 15 in a sealing relation therewith (relative to the exterior of the pipe); and, that is fastened securely to, or movable vertically with the conduit 16 at all times. This is accomplished by means of any feasible fastening structure, e.g. three connecting links 18 as illustrated. Pipe 17 is employed for introducing a tracer material downhole. At the lower extremity, there is an open end 21 of the pipe 17 which is located a short distance above an open end 22 of the conduit 16. This distance is continuously maintained by reason of the immovable attachment of pipe 17 to the conduit 16.

Extending through the seal 15 there is a tube 24 that merely connects the upper end of annular space 25 (which surrounds the conduit 16 downhole of the well 11) with the surface or outlet of the stream flowing through tube 24.

It will be observed that there is a valve 26 in the conduit 16 in the surface end thereof. This is for regulating the flow of fluid through the conduit in setting up and carrying out the operation of the invention, as will be more fully described below. Following the valve 26 in the flowing stream of fluid within conduit 16, there is a tracer detector 27. This detector may take any feasible form, as required, for detecting the presence of whatever tracer material is employed and introduced downhole through the pipe 17. After the fluid stream within conduit 16 leaves the tracer detector 27, it flows through a meter 28 for indicating and/or recording the rate of flow of fluid through the conduit 16.

Similarly in the tube 24 there is another valve 31 that may regulate the flow of the stream of fluid which passes up the annulus 25 and out through the tube 24. There is also another meter 32, for measuring the rate and quantity of flow of the annulus fluid stream.

A method according to the invention may be carried out with the above described and illustrated apparatus, in the following manner. The total flow of fluid being produced from zone 12 in the well 11, may be divided into two separate streams. One of these streams flows up the annulus 25, while the other enters the open end 22 and flows up through the conduit 16. With the open end 22 of conduit 16 set at a given location within the vertical extent of the producing zone 12, the rate of flow of fluid through the conduit 16 may be assigned a value designated $Q_p$. The remaining portion of the fluid flowing from zone 12, will flow in the annulus 25 and may be assigned a flow rate value designated $Q_a$. Now, it will be observed that by introducing a tracer material through pipe 17 at a very low rate of flow (so as to be negligible with respect to the total fluid flow, i.e. $Q_a+Q_p$): the flow rate, or rate of fluid flow in conduit 16, i.e. $Q_p$, may be adjusted by regulating valve 26 so that an interface 35 that represents a no vertical flow condition, will lie directly at the vertical level where open end 22 of the conduit 16 stands. When such condition has been reached the fluid stream $Q_p$ is all drawn from the zone 12 below the level of the interface 35, while all of the remaining fluid, i.e. $Q_a$, is being drawn from the remaining portion of zone 12 (above the interface 35). The foregoing condition of flow division may be reached by commencing first with the relative flow rates such that some of the tracer being introduced via open end 21 of the pipe 17 is being detected by detector 27, i.e. in the conduit stream $Q_p$ flowing through the conduit 16. Then by gradually reducing the flow of fluid in this conduit stream, e.g. by manipulating valve 26, flow may be reduced until just beyond the point of incipient tracer disappearance. When such flow conditions have been reached, it will be clear that the interface 35 is then located substantially at the lower end of the conduit 16, as illustrated in the drawing. At that time a reading of the flow in each of the conduit and annulus streams may be taken from the meters 28 and 32 respectively. And at the same time, the location of the open end 22 may be determined by noting the position of conduit 16 knowing its exact length.

It will be noted that the foregoing procedure as so far described, will be carried out successively for a sufficient number of different locations of open end 22 to cover the entire vertical extent of producing zone 12 from bottom to top, in order to obtain a complete productivity log of the formation.

The productivity log that is made from the results of the indicated procedure could take various forms. For example, it could be in the form: volume entering the well, per unit time, per foot, taken against depth; or it could be in the form: cumulative volume entering the well, per unit time, taken against depth. For the first form, the log would be prepared by increments: e.g. as indicated by the expression $$\frac{Q_{P2}-Q_{P1}}{d_1-d_2} \text{ vs } \frac{d_1+d_2}{2} \quad (1)$$

where $Q_{P1}$ is the volume entering the well below a given point, and $d_1$ is the depth to that given point; while $Q_{P2}$ is the volume entering the well below a higher point, and $d_2$ is the depth to that higher point. Similarly for the second form, the log would be prepared by ordinary determinations: e.g. as indicated by the expressions $$Q_{P1} \text{ vs. } d_1 \quad (1)$$

$$Q_{P2} \text{ vs. } d_2 \quad (3)$$

etc. working from the bottom of the producing interval.

It will be observed that the first form of log (1), may also be obtained by derivation from the slope of a curve obtained by plotting the second form of log (2) (3) etc., e.g. by plotting slope according to the expression:

$$\frac{\text{delta } Q_P}{\text{delta } d}$$

where $Q_P$ is the volume entering at any given point along the curve, and $d$ is the depth at the same point. Of course, the $Q_P$ of the foregoing expressions can also be expressed as a fraction or percent of the total volume entering the well.

It will be observed that this technique provides a simple arrangement for productivity logging that eliminates the need for any downhole detection equipment. At the same time this type of logging procedure enables a sampling of the produced fluid which is directly related to particular portions of the producing zone so that valuable information concerning production at any point over the entire producing zone may be had.

It will be observed that this invention might be carried out employing the location of the open ends 21 and 22 in the reverse relative situation. Thus, if the pipe 17 were attached so that its open end 21 extended somewhat below the open end 22 of the conduit 16, instead of the positions illustrated, the procedure could be carried out by in effect reversing the manipulation of relative flow rates for the two streams formed, i.e. as the flow proceeds through conduit 16 and through the annulus 25. In such an arrangement the tracer detector would be attached to tube 24 and the flow rates would be adjusted so that when the tracer disappeared from the annulus stream, the interface 35 would have arrived at substantially the same location relative to open end 22; but it would have moved therefrom beneath the open end 22 of the conduit 16 rather than from above such open end.

It is also pointed out that the steps involved in locating the position of the interface 35 might be carried out without varying relative flow rates of the two streams to move the interface position. Instead the conduit 16 (and attached pipe 17) might be moved until the same relative conditions are found as is the case with the foregoing manner of carrying out the process. This is true since the movement of the interface 35 is relative to the conduit 16, and for a given position of interface 35 the conduit may be moved until it is located at the interface (instead of the reverse where the interface 35 is caused to move by the manipulation of the flow rates of the two streams). Of course, the same basic steps are involved, viz. the produced fluid is divided into two streams, a tracer material is introduced into one of the streams and the presence of the tracer is detected. Then having adjusted the flow of the two streams to set the interface location at a given approximate position, the conduit 16 (and attached pipe 17) will be moved until the tracer is no longer detected in the stream. When the latter state has been reached the measurement of the location of the open end may be taken by observing the position of the conduit 16, knowing its length.

It is to be noted further that it might be beneficial to employ structure (not shown adjacent to the open end of the conduit, for reducing or tending to prevent a mixing across the "no vertical flow" or interface between the two fluid streams.

As indicated above, any feasible tracer material may be employed, however helium is a preferred tracer material for use in gas well logging operations. It will be noted also that the relative size of the pipe 17 and conduit 16 are not necessarily accurate in the schematic illustration of the drawing and probably the pipe 17 would be a relatively small diameter pipe.

It is pointed out that for the most desirable conditions, particularly in gas well logging, it would be preferable to have the cross-sectional area of the interior of conduit 16 on the same size order as the cross-sectional area of the annular space 25 which surrounds the conduit.

While the foregoing description of the invention sets forth preferred embodiments in considerable detail in accordance with the applicable statutes, this is not to be taken as in any way limiting the invention, but merely as being descriptive thereof.

I claim:
1. In a gas producing well having a producing zone therein with a limited vertical extent, the combination comprising a vertically movable conduit extending down hole with the open end thereof located vertically between the extremities of said producing zone, a pipe fixedly attached to the exterior of said conduit for vertical movement therewith at all times and extending down beside the conduit, said pipe having an open end located adjacent to but displaced a relatively short vertical distance from said conduit open end, means for sealing said well at the top thereof around said conduit and pipe, means for connecting the annulus of the well around said conduit for passing one stream of said gas therethrough, another stream of said gas flowing through said conduit, means connected to one of said conduit and said annulus connecting means and located at the surface adjacent to said well for detecting the presence of a tracer material that is introduced down hole through said pipe, and means for regulating the relative rate of flow of said two streams of gas in order that the location of the interface between said two streams may be shifted until the presence of tracer material is no longer detected.

2. The combination according to claim 1 wherein said pipe is small in diameter relative to said conduit.

3. The combination according to claim 2 wherein said detecting means is associated with said conduit.

4. The combination according to claim 3 wherein said tracer material is helium.

References Cited
UNITED STATES PATENTS

| | | | |
|---|---|---|---|
| 2,996,615 | 8/1961 | McKay et al. | 250—43.5 |
| 3,077,104 | 2/1963 | Fowler | 73—40.7 X |
| 3,123,708 | 3/1964 | Limanek | 73—155 X |

JAMES J. GILL, *Acting Primary Examiner.*

RICHARD C. QUEISSER, *Examiner.*

J. W. MYRACLE, *Assistant Examiner.*